United States Patent
Schwarz et al.

(10) Patent No.: US 7,836,680 B2
(45) Date of Patent: Nov. 23, 2010

(54) AIRCRAFT COMBINATION ENGINES THERMAL MANAGEMENT SYSTEM

(75) Inventors: Frederick M. Schwarz, Glastonbury, CT (US); Jorn A. Glahn, Manchester, CT (US); Brian M. Fentress, Marlborough, CT (US)

(73) Assignee: United Technologies Corporation, Hartford, CT (US)

( * ) Notice: Subject to any disclaimer, the term of this patent is extended or adjusted under 35 U.S.C. 154(b) by 784 days.

(21) Appl. No.: 11/820,722

(22) Filed: Jun. 20, 2007

(65) Prior Publication Data
US 2008/0314573 A1 Dec. 25, 2008

(51) Int. Cl.
*F02K 3/00* (2006.01)

(52) U.S. Cl. .................. 60/226.1; 60/225; 60/785

(58) Field of Classification Search .............. 60/224, 60/225, 782, 785, 226.1, 262
See application file for complete search history.

(56) References Cited

U.S. PATENT DOCUMENTS

| | | | | |
|---|---|---|---|---|
| 2,356,557 A | * | 8/1944 | Anxionnaz et al. ........... 60/248 |
| 2,385,366 A | * | 9/1945 | Lysholm ........................ 60/248 |
| 2,465,099 A | * | 3/1949 | Johnson ........................ 60/224 |
| 4,815,282 A | * | 3/1989 | Wilkinson et al. ............. 60/247 |
| 7,485,981 B2 | * | 2/2009 | Schwarz et al. ............... 290/52 |
| 7,690,188 B2 | * | 4/2010 | Schwarz et al. ............... 60/224 |
| 2008/0277533 A1 | * | 11/2008 | Schwarz et al. ........... 244/53 B |

\* cited by examiner

*Primary Examiner*—Michael Cuff
*Assistant Examiner*—Phutthiwat Wongwian
(74) *Attorney, Agent, or Firm*—Kinney & Lange, P.A.

(57) ABSTRACT

An engine combination for generating forces with a gas turbine engine generating force that utilizes an engine lubricant for lubricating moving components in the turbofan engine, and an internal combustion engine provided in the combination as an intermittent combustion engine generating force that utilizes a coolant for transporting heat generated in the intermittent combustion engine away therefrom and having an air intake, there being an air transfer duct connected from a compressor in the gas turbine engine to the air intake to transfer compressed air thereto. A coupling heat exchanger is coupled to both the gas turbine engine and the intermittent combustion engine to have the engine lubricant and the coolant pass therethrough. A further cooling heat exchanger is coupled to both the coupling heat exchanger and the intermittent combustion engine to have a remote fluid from a source thereof and the coolant pass therethrough.

20 Claims, 3 Drawing Sheets

AIRCRAFT COMBINATION ENGINES THERMAL MANAGEMENT SYSTEM

CROSS-REFERENCE TO RELATED APPLICATION

Referenced herein is U.S. application Ser. No. 11/713,262 filed Mar. 2, 2007 for "COMBINATION ENGINES FOR AIRCRAFT" by Frederick M. Schwarz, Brian M. Fentress, Andrew P. Berryann, Charles E. Lents and Jorn A. Glahn.

BACKGROUND OF THE INVENTION

The present invention relates to gas turbine engines for aircraft and, more particularly, to gas turbine engines each coupled to a corresponding auxiliary engine.

Gas turbine engines as continuous combustion, open Brayton cycle internal combustion engines have come to dominate as the power plants for larger, faster aircraft to essentially the exclusion of reciprocating engines, or internal, intermittent combustion engines, earlier used as power plants for these kinds of aircraft. This is largely because of the greater power-to-weight ratio of gas turbine engines versus internal combustion engines, especially in large horsepower engines, or, more appropriately, large thrust engines in which those large thrusts are provided with a relatively small, and so smaller drag, frontal area engine structures relative to reciprocating engines. Gas turbine engines generate such large thrusts for propulsion, or horsepower for engines with an output shaft, by combining large volumes of air with large amounts of fuel, and thereby form a jet of large velocity leading to the capability to provide desired speedy flights.

In addition to providing thrust, such gas turbine engines have operated integrated drive generators to generate electricity for the aircraft and for the engine electronic controls. The amount of electricity needed for these purposes in the past has tended to be relatively modest typically in the range of a few hundred kilowatts of electrical power but, with recently arriving new aircraft, exceeding a megawatt of power. However, there are some aircraft, usually for military uses, that have come to have needs for much larger amounts of electrical power either on a relative basis, the electrical power needed relative to the capability of the gas turbine engine available, or on an absolute basis with power needs significantly exceeding a megawatt. Furthermore, such demands for electrical power in military aircraft often occur at relatively high altitudes and often occur unevenly over relatively long time durations of use, that is, large peaks repeatedly occur in electrical power demand in the course of those long use durations.

Corresponding attempts to obtain the added power from the typical aircraft propulsive system, the gas turbine engine, that are needed to operate the concomitant much larger capacity electrical generators, either on a relative or absolute basis, will subtract significantly from the thrust output of the available turbine or turbines. Making up that thrust loss in these circumstances by operating such available turbine engines so as to increase the thrust output thereof causes the already relatively low fuel use efficiency during flight to decrease significantly, which can severely limit the length of otherwise long duration uses, and also brings those engines closer to becoming operationally unstable.

One alternative to using the gas turbine engine as the sole source of power to operate an electrical power generator is to add in the aircraft a further intermittent combustion internal combustion engine, such as gasoline engines operating on the any of the Diesel, Miller, Otto or Wankel cycles. Such engines can operate with a fuel efficiency on the order of seventy percent (70%) better than that of a continuous combustion (Brayton cycle) internal combustion gas turbine engine. At high altitudes, internal combustion engines of all kinds face the possibility of limited power output because of the relatively small air pressures there limiting the chemical reactions of oxygen with hydrogen and oxygen with carbon in the burning of the engine fuel in the engine combustion chamber or chambers. This can be solved for gas turbine engines by providing therein very large air flows through use, typically, of axial flow compressors usually in two stages with both a low compression compressor followed along the fluid flow path through the engine by a high compression compressor. This arrangement provides at least enough compressed air to the subsequent combustor to sustain the desired combustion process therein and a mass of airflow sufficient to combine with enough fuel to provide the energy needed to overcome the aircraft drag at the speed and altitude intended for operation.

However, such compressors can provide considerably more compressed air than the minimum needed for this purpose thereby allowing some of this compressed air to be delivered through an air transport duct to the air intake of an intermittent combustion internal combustion engine so that, in effect, the compressors of the gas turbine engine serve as a very capable supercharger for that intermittent combustion engine. Thus, this intermittent combustion engine can be operated at the same relatively high altitudes at which the gas turbine engine propelling the aircraft operates while this turbine engine is also supplying compressed air to that intermittent combustion engine. There, depending on the values selected for the peak air intake pressure and engine compression ratio, the intermittent combustion engine can be used as a power source for an electrical power generator that can generate much greater amounts of electrical power than can one powered by a gas turbine engine.

In such aircraft so equipped with a gas turbine engine used as a supercharger for an accompanying intermittent combustion engine while also propelling the aircraft, the amount of electrical power needed at any time during flights thereof substantially determines the amount of torque needed to be supplied by the intermittent combustion engine to the electrical power generator. The amount of torque generated is determined by the amount of fuel supplied to the combustion chambers of the intermittent combustion engine, and there is a corresponding amount of air that must also be supplied to those chambers to support the desired combustion therein made possible at those high altitudes by the turbocharging of the gas turbine engine. However, the small density and pressure of the air there also makes it difficult to use that air to provide sufficient cooling for the lubricants used for in each of the gas turbine and intermittent combustion engines, the heat generated in such lubricants in any event being wasted by such air cooling in having that heat lost to the atmosphere. Thus, there is a desire to reduce the amount of wasted heat while still providing the necessary cooling.

BRIEF SUMMARY OF THE INVENTION

The present invention provides an engine combination for generating forces with a gas turbine engine having an air inlet open to the atmosphere, an air compressor, a combustor, a turbine and an exhaust exit nozzle open to the atmosphere positioned along a fluids flow path passing through all for generating force, and utilizing an engine lubricant for lubricating moving components in the gas turbine engine, with the air compressor having an air transfer duct extending therefrom so as to receive compressed air therein. In addition, an internal combustion engine is provided in the combination as an intermittent combustion engine having an air intake coupled to combustion chambers therein along with a rotatable output shaft for generating force also coupled to those combustion chambers, and utilizing a coolant for transporting heat generated in the intermittent combustion engine away therefrom, the air transfer duct being connected to the air intake to transfer compressed air thereto. A coupling heat exchanger is coupled to both the gas turbine engine and the intermittent combustion engine as a first coupling subsystem to have the engine lubricant and the coolant pass therethrough to thereby permit the coolant to transport heat in the engine lubricant away therefrom. A further cooling heat exchanger is coupled to both the coupling heat exchanger and the intermittent combustion engine as a second coupling subsystem to have a remote fluid from a source thereof and the coolant pass therethrough to permit the remote fluid to transport heat in the coolant away therefrom, and with the coolant also circulating through at least one of the coupling heat exchanger and the intermittent combustion engine. A primary electrical generator having an output conductor can have a rotatable input shaft connected to the intermittent combustion engine output shaft with the output conductor being electrically energized in response to rotation of the input shaft, and utilizing a generator lubricant that is cooled by the coolant in another coupling heat exchanger.

DETAILED DESCRIPTION

Keeping heat in operating internal combustion engines of all kinds that has been generated in those engines during such operation thereof increases the thermodynamic efficiency of those operations. Of course, there are limits to operating those engines with such a goal that are imposed by the maximum temperatures that various engine components can withstand before failing in some manner. These limits are avoided typically by providing suitable cooling arrangements of some sort for the engines, and sometimes their loads devices, but such cooling should not be overdone as this cooling requires using energy therefor that is typically supplied from the engines being cooled. Such energy use thereby reduces the energy from the engines that would otherwise be available for propulsion or such other tasks that have been assigned to the engine. That is, the engines and their loads should be operated at their maximum feasible operating temperatures for reasons of efficiency.

In an aircraft with two internal combustion engines, a gas turbine engine and an intermittent combustion engine with the former providing both aircraft propulsion and supercharged air to the latter, the corresponding cooling system used therewith must, insofar as feasible, keep available to them as much of the heat generated in both of them to obtain good thermodynamic efficiency. At some operating temperatures, of course, some of this heat must be transported out of at least some parts of the engine to avoid heat based component failures and, in avoiding the wasting of same, this removed heat can be used to provide added thrust beyond that which is being provided by the gas turbine engine. Only in unusual situations, such as the aircraft carrying hot fuel on a hot day, should this cooling system reject heat to the atmosphere as a system heat loss.

Figure 1:
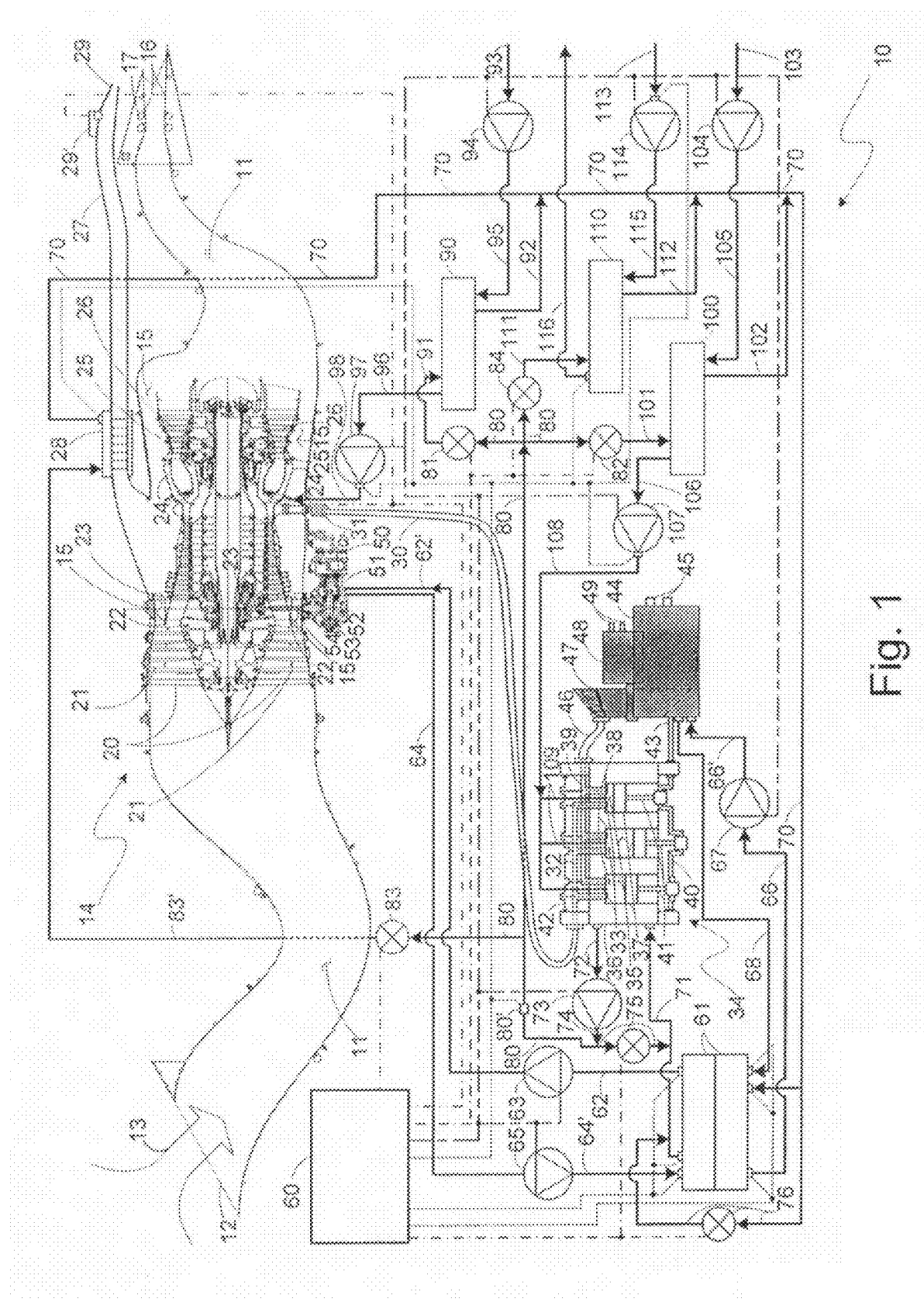
FIG. 1 is a schematic representation of a cross section side view of a portion of an aircraft embodying the present invention.

FIG. 1 shows a schematic representation of a cross section side view of a portion of an aircraft with an example of such a cooling system for a gas turbine engine and intermittent combustion engine combination, 10, in an arrangement in which most of the aircraft structure in which they are positioned has been omitted from this view. However, there is at least a portion of an engine duct, 11, in that aircraft that is shown and has an air inlet, 12, facing forward in the aircraft. The configuration shown for duct 11, with its somewhat sinuous shape, is from a stealth type military aircraft, several kinds of which are unmanned aircraft. This duct first curves downward, coming from the front of the aircraft at the duct opening provided by air inlet 12 to the atmosphere from which an airstream, 13, is drawn. The duct then curves upward to open to a gas turbine engine provided as a turbofan engine, 14, in engine duct 11 which uses airstream 13 for combustion and for fan forced air propulsion purposes. This passageway curvature of duct 11 past air inlet 12 serves to hide the front of engine 14 from impinging electromagnetic radiation at various wavelengths. Outer portions, 15, of duct 11 adjacent engine 14 past a splitter convey the fan forced air provided by engine 14 for propulsion purposes into the remainder of duct 11 past engine 14 toward the outlet of duct 11 to the atmosphere as will be described below.

This fan forced air and the combustion products resulting from combustion in engine 14 are forced out of the remainder of engine duct 11 to an exit nozzle, 16, serving as the outlet of duct 11. A fluid actuation system, 17, provides the force to partial open and close nozzle 16 during the operation of turbofan engine 14. Again, duct 11 past engine 14 first curves downward, coming from that engine, and then the duct curves upward to open to nozzle 16. Here, too, this passageway curvature of duct 11 past engine 14 serves to hide the rear of engine 14 from electromagnetic radiation at various wavelengths impinging at the rear of the aircraft.

Engine 14 has an air inlet guide vane, 20, followed by a high pressure fan, 21, as the fan for the turbofan engine to force air outside and past a splitter, 22, and then through duct portions 15 into the rear of duct 11 and out of that duct through nozzle 16 to exit to the atmosphere. In addition, high pressure fan 21 also serves as a low pressure air compressor through delivering compressed air inside splitter 22 to a high pressure air compressor, 23. The compressed air from high pressure compressor 23 arrives at a combustor, 24, to which fuel is also delivered and burned. The combustion products form a jet of fluid which impinges first on a high pressure turbine, 25, and then on a low pressure turbine, 26, to cause them to rotate which, through appropriate mechanical linkings, leads to high pressure compressor 23 and high pressure fan 21 being forced thereby to also rotate. The combustion products then reach the remainder of duct 11 past engine 14 to exit through nozzle 16 to the atmosphere.

The thrust provided by the air from fan 21 forced out of nozzle 16 and the combustion products exiting through that nozzle is supplemented by the thrust provided by air from fan 21 that is forced out of a cooling duct, 27, extending toward the rear of engine 14 from a part of outer duct portion 15 that opens thereto just to the rear of splitter 22. The air entering this cooling duct from outer portion 15 is heated in an air-to-coolant heat exchanger, 28, to provide this added thrust while removing heat from the engines and generator coolant, and this air is forced to exit through a further controlled variable area nozzle, 29, having a position set by a control motor, 29'. The coolant enters a tube at the left entrance port of air-to-coolant heat exchanger 28, flows through a spaced apart set of tubes parallely connected to that port, and exits those tubes through the right exit port of this exchanger to which the tubes are also parallely connected at their opposite ends. Air flows through cooling duct 27 from outer portion 15 about and past this set of tubes to absorb heat therefrom which it transports to nozzle 29.

A compressed air conveyance duct, 30, is connected at one end into turbofan engine 14 to receive compressed air from high pressure compressor 23 through a compressed air flow control valve, 31, typically controlled by a system computer or controller (not shown but typically an engine control computer or an aircraft systems computer either eliminating the need for such an engine control computer or operating with it in a distributed control system), and used to control the flow of compressed air from high pressure compressor 23 through duct 30. The opposite end of duct 30 is connected to an air intake, or intake manifold, 32, leading to engine air intake valves, 33, for an intermittent combustion engine, 34, represented in the example of FIG. 2 as a Diesel or Otto cycle engine. Intermittent combustion engine 34 is shown positioned forward in the aircraft of turbofan engine 14 to shift the center of mass of the aircraft forward to counter some of the weight of engine 14 but other positions are possible to be used if desired.

Valves 33 in engine 34 control the air taken into combustion chambers, 35, bounded by an engine block, 36, providing the basic structure of engine 34 and by pistons, 37. Each chamber also has an exhaust valve, 38, through which combustion products are exhausted to an exhaust manifold, 39. A rotatable crankshaft, 40, has a connecting rod, 41, rotatably coupling it to a corresponding one of each of pistons 37. A rotatable camshaft, 42, is used to open and close air intake valves 33 and exhaust valves 38 in a suitable sequence.

Crankshaft 40, under the control of a system controller not shown, is rotated by the force on pistons 37 transmitted thereto by corresponding ones of connecting rods 41 due to repeated combustion events in the corresponding combustion chamber 35 which events occur in all of chambers 35 in a suitable sequence before repeating. These events correspondingly use the air quantities taken through valves 33 repeatedly into, and the fuel quantities repeatedly injected into, those chambers for combustion. The fuel quantities are injected by a fuel injection system not seeable in this figure and the magnitudes thereof are used to select the mechanical power output of crankshaft 40 of the intermittent combustion engine. The resulting combustion products are correspondingly repeatedly rejected from those chambers through valves 38. If an Otto cycle engine is used as intermittent combustion engine 34, the combustion events are initiated by the repeated sparkings of spark plugs not shown in this figure in a suitable sequence across combustion chambers 35 under the control of the system controller. In addition, intermittent combustion engine 34 has a cooling system not shown for cooling the engine structure about combustion chambers 35.

The rotation of crankshaft 40 is suitably fastened to an input shaft, 43, of a primary electrical power generator, 44. The resulting rotation of input shaft 43 electrically energizes output electrical conductors, 45, of generator 44 to thereby generate the desired electrical power thereat for operating aircraft devices (not or not all shown). The demand for electrical power in the aircraft is used as a basis to select the fuel quantities injected in the combustion chambers of the intermittent combustion engine to have that engine supply sufficient mechanical power crankshaft 40 to sufficiently rotate input shaft 43 of generator 44 to meet that demand.

An exhaust duct, 46, extends from exhaust manifold 39 of intermittent combustion engine 34 to a passthrough connection, 47, in the engine nacelle wall which is connected to an exhaust manifold, 48, shaped similar to a toroidal shell which is affixed in the engine to the wall about the high pressure turbine. Openings extend from the interior of manifold 48 through this wall so that intermittent combustion engine exhaust impinges on the vanes and blades of that turbine to thereby aid in causing it to rotate.

A supplemental electrical power generator is provided in this example by operating an electrical starter (generator), 50, with the electrical motor therein operated also as an electrical generator after the completion of the starting process. Starter (generator) 50 rotates high pressure air compressor 23 to start turbofan engine 14 and, thereafter, with engine 14 operating, this compressor can selectively rotate the rotor in starter (generator) 50 to cause the starter motor to be operated as an electrical power generator.

Starter (generator) 50 has a drive (input) shaft, 51, extending from the rotor therein to a set of bevel gears, 52, with the bevel gear on the opposite side of this set rotatably coupled to a clutch, 53. Clutch 53 allows the system computer to engage and disengage starter (generator) 50 as appropriate. The opposite side of clutch 53 has an engagement shaft, 54, extending therefrom ending in bevel gear rotatably engaged with a counterpart bevel gear in a portion of high pressure air compressor 23.

The remainder of the cooling system in FIG. 1, selectively supplying heated coolant to air-to-coolant heat exchanger 28, and removing same therefrom, is operated under control of a computer, 60, (which may also control other aspects of engines 14 and 34 as well as primary electrical power generator 44, or be a separate computer just for the cooling system). Computer 60 does so by operating various computer controlled pumps (with the corresponding control and information transfer lines between computer 60 and these pumps being represented as dashed lines with alternating long and short dashes in the figure) and computer controlled valves (with the corresponding control and information transfer lines between computer 60 and these valves being represented as dashed lines with alternating dashes and dots in the figure) in the cooling system to manipulate the coolant flows therein. A typical coolant used would be a mixture of water and glycol. Computer 60 also controls lubricant flows in the lubricating systems of turbofan engine 14 and primary electrical generator 44 by computer controlled pumps to manipulate lubricant flows therein with the corresponding control and information transfer lines between computer 60 and these pumps again being represented as dashed lines with alternating long and short dashes. The various conduit interconnection lines for the lubricants and the coolant are represented by wider (or bolder) lines in the figure.

The controls of these various flows are based on the computer programs provided in computer 60, and on the data obtained from various temperature sensors and pressure sensors (pressure sensors not shown) provided in the cooling and lubricating systems involved. The corresponding control and information transfer lines between computer 60 and the temperature sensors provided are represented as dashed lines with short dashes in FIG. 1.

In the system of FIG. 1, the coolant is heated by the lubricant used in turbofan engine 14, which lubricant absorbs heat during operation of that engine, and by the lubricant used in generator 44 which absorbs heat during operation thereof. Heat from these two lubricants is transferred to the coolant in a dual lubrication liquids-to-coolant heat exchanger, 61. The coolant is caused to flow in an outer chamber provided in this exchanger about two independent sets of tubes positioned therein with each set having its tube interiors sealed from the chamber. This coolant enters this chamber at an interior return port shown between two exterior lubricant ports in the lower half of lubricants-to-coolant heat exchanger 61 in FIG. 1, at which interior port there is provided a coolant temperature sensor represented as a rectangle. This coolant in the chamber exits therefrom at an interior exit port shown between two exterior lubricant ports in the upper half of lubricants-to-coolant heat exchanger 61 in FIG. 1, at which interior port there is also provided a coolant temperature sensor represented as a rectangle. One set of tubes is in the upper half of lubricants-to-coolant heat exchanger 61 and is for carrying flows of the turbofan lubricant between the two exterior ports there, at each of which there is provided a corresponding lubricant temperature sensor represented as a rectangle. The remaining set of tubes is in the lower half of lubricants-to-coolant heat exchanger 61 for carrying flows of the generator lubricant between the two exterior ports there, again at each of which there is provided a corresponding lubricant temperature sensor.

The structure of lubricants-to-coolant heat exchanger 61 will be further described below. In the alternative, two separate lubricant liquids-to-coolant heat exchangers could instead be used with each connected into the cooling system by corresponding conduit interconnection lines circulating coolant through each.

Engine lubricant circulates between the set of tubes in the upper half of lubricants-to-coolant heat exchanger 61 in FIG. 1 and the gearbox in which bevel gears 52 are located in turbofan engine 14. This lubricant flows from the exit one of the two exterior ports in the upper half of exchanger 61 through a pressurization line, 62, as pressurized by a computer controlled turbofan lubricant pressurization pump, 63, to the inlet of which this line is connected, with pump 63 under control of computer 60. The lubricant flows through a further portion of the pressurization line, 62', connected to the pump outlet, to a lubricant entrance port in this gearbox. That lubricant, after providing lubrication and absorbing heat in this gearbox and engine, then returns to the heat exchanger by flowing out of a gearbox lubricant exit port and through a scavenger return line, 64, as further pressurized by a computer controlled scavenger pump, 65, to the inlet of which this line is connected with pump 65 also under control of computer 60. The lubricant flows through a further portion of the scavenger return line, 64', connected to the pump outlet, to the remaining exterior entrance port of this upper half of exchanger 61 to flow through the set of tubes therein to the exit exterior port.

Generator lubricant circulates between the set of tubes in the lower half of lubricants-to-coolant heat exchanger 61 in FIG. 1 and the interior moving components of generator 44 that are being lubricated. This lubricant flows from the exit one of the two exterior ports in the lower half of exchanger 61 through a pressurization line, 66, as pressurized by a computer controlled generator lubricant pressurization pump, 67, to the inlet of which this line is connected, with pump 67 under control of computer 60. The lubricant flows through a further line, 66', connected to the pump outlet, to the lubricant entrance port on the lower left side of this generator in FIG. 1. That lubricant, after providing lubrication and absorbing heat in that generator, then returns by flowing out of the remaining generator lubricant exit port also on the lower left side of this generator and through a return line, 68, to the remaining exterior entrance port of this lower half of exchanger 61 to flow through the set of tubes therein to the exterior exit port.

The coolant, returning to lubricants-to-coolant heat exchanger 61 from cooling devices to be described below, returns there through a return conduit interconnection line, 70, at the interior chamber return port in the lower half of lubricants-to-coolant heat exchanger 61. This coolant is drawn through the exchanger chamber to the interior chamber exit port in the upper half of lubricants-to-coolant heat exchanger 61 and into an intermittent combustion engine coupling line, 71, to pass through that line into the cooling ducts interior to engine block 36 at the block entrance port of those ducts on the lower left side of intermittent combustion engine 34. That coolant exits these block cooling ducts at a block exit port therefor on the upper left side of engine 34 to enter a coolant pump coupling line, 72, with the coolant draw being provided by a computer controlled pressurization coolant pump, 73, connected to the opposite end of line 72.

An outlet line, 74, extending from the output of pump 73, is connected to a bypass valve arrangement, 75, to allow computer 60 to direct the coolant flow to be more or less confined to just circulating through intermittent combustion engine 34. This is useful in certain circumstances such as when the engine is cold after an initial starting to thereby heat it faster by not sending the coolant through the cooling devices to be described below. Thus, pump 73 again draws coolant out of engine 34 in this instance but from there it passes through bypass arrangement 75 when opened by computer 60 to reenter engine 34. Bypass arrangement 75 comprises a valve input line connected between line connected between outlet line 74 and a computer controlled valve, the computer controlled valve, and a valve outlet line connected between this computer controlled valve and intermittent combustion engine coupling line 71.

A similar bypass arrangement, 76 is provided between the interior chamber coolant entrance port in the lower half of lubricants-to-coolant heat exchanger 61 and the exterior chamber coolant exit port in the upper half of this exchanger to allow computer 60 in similar circumstances to direct reducing the amount of cooling of the engine and generator lubricants. So, again, for instance, when turbofan engine 14 and generator 44 are cold after an initial starting, they can thereby heat faster by computer 60 not sending the coolant previously cooled the cooling devices to be described below through exchanger 61 through opening bypass arrangement 76. Bypass arrangement 76 comprises a valve input line connected between line connected between return line 70 and a computer controlled valve, the computer controlled valve, and a valve outlet line connected between this computer controlled valve and intermittent combustion engine coupling line 71.

If computer 60 has directed bypass arrangement 75 to close while directing computer controlled pressurization coolant pump 73 to pump coolant out from the cooling ducts interior to engine block 36 in intermittent combustion engine 34, the coolant is forced instead toward the cooling devices through a coolant manifold conduit interconnection line, 80. A coolant manifold temperature sensor, 80', is provided in line 80 just after the outlet of pump 73. Coolant manifold line 80 splits into four branches each of which is connected to a corresponding computer controlled valve, 81, 82, 83 and 84, that computer 60 uses to permit or deny some amount of coolant being forced by pump 73 into the corresponding heat exchanger subsequent to each of those valves that together serve as the system cooling devices for the coolant. One of those cooling devices has been previously described, air-to-coolant heat exchanger 28, to left port of which valve 83 is connected by a coolant conduit interconnection line, 83', with the others to be described below. Such an arrangement allows computer 60 to allocate which of the various cooling devices are to be used to remove the heat accumulated in the coolant directly from intermittent combustion engine 34 in the cooling ducts in block 36 thereof, and accumulated in the coolant indirectly from both turbofan engine 14 and primary electrical generator 44 through lubricants-to-coolant heat exchanger 61.

The most efficient use of this heat accumulated in the coolant is to transfer it to the fuels used to operate turbofan engine 14 and intermittent combustion engine 34 to thereby provide additional heat in those engines through their fuels to raise the thermodynamic efficiency of each. Thus, to this end, computer 60 will cause computer controlled valve 81 for the turbofan engine fuel heat absorption to open to admit coolant under pressure from computer controlled pressurization coolant pump 73 to the chamber of a first coolant-to-fuel heat exchanger, 90, through an interconnection line, 91, connected to the coolant entrance right upper port thereof. There, the admitted coolant flows about and past the set of tubes therein that will carry the turbofan engine fuel sealed therein away from that coolant to raise the temperature of that fuel. This coolant, with its temperature lowered by the transfer of heat to such fuel, will exit the chamber through the coolant exit left lower port of exchanger 90 to reach return line 70 through a further interconnection line, 92.

Fuel for turbofan engine 14 is drawn from a storage tank therefor (not shown) through an interconnection line, 93, by a tank fuel pump, 94, to the inlet of which this line is connected. Under control of computer 60, the fuel flows through a further line, 95, connected to the pump outlet, to the fuel entrance lower right port of exchanger 90 to enter the set of tubes in the chamber thereof. The fuel, heated by the coolant flowing through the chamber, flows out of those tubes in exchanger 90 through the fuel exit left upper port thereof into another line, 96, connected to the inlet of a turbofan engine fuel pressurization pump, 97, from where it is forced at the pump outlet (this outlet having a fuel temperature sensor threat represented as a rectangle) under control of computer 60 through a further line, 98, into combustor 24 of turbofan engine 14.

Similarly, computer 60 will cause computer controlled valve 82 for the intermittent combustion engine fuel heat absorption to open to admit coolant under pressure from computer controlled pressurization coolant pump 73 to the chamber of a second coolant-to-fuel heat exchanger, 100, through an interconnection line, 101, connected to the coolant entrance right upper port thereof. There, the admitted coolant flows about and past the set of tubes therein that will carry the intermittent combustion engine fuel sealed therein away from that coolant to raise the temperature of that fuel. This coolant, with its temperature lowered by the transfer of heat to such fuel, will exit the chamber through the coolant exit left lower port of exchanger 100 to reach return line 70 through a further interconnection line, 102.

Fuel for intermittent combustion engine 34 is drawn from a storage tank therefor (not shown) through an interconnection line, 103, by a tank fuel pump, 104, to the inlet of which this line is connected. Under control of computer 60, the fuel flows through a further line, 105, connected to the pump outlet, to the fuel entrance lower right port of exchanger 100 to enter the set of tubes in the chamber thereof. The fuel, heated by the coolant flowing through the chamber, flows out of those tubes in exchanger 100 through the fuel exit left upper port thereof into another line, 106, connected to the inlet of a intermittent combustion engine fuel pressurization pump, 107, from where it is forced at the pump outlet (this outlet also having a fuel temperature sensor thereat represented as a rectangle) under control of computer 60 through a further line, 108, into a set of fuel injectors, 109, one for each combustion chamber 35 of intermittent combustion engine 34.

In the typical aircraft operating environment, the fuels en route to turbofan engine 14 and intermittent combustion engine 34 will be unable to absorb sufficient heat from the coolant to sufficiently cool same without the temperatures of those fuels coming to exceed acceptable limits therefor. Thus, additional heat must be removed from the coolant and, to avoid losing the energy in that heat, computer 60 in FIG. 1 will cause computer controlled valve 83 for air-to-coolant heat exchanger 28 to open to admit coolant under pressure from computer controlled pressurization coolant pump 73 to flow through interconnection line 83' connected to the coolant entrance left upper port of this exchanger, and then through the tube set therein. This coolant thereby heats the air flowing past those tubes that has been forced by high pressure fan 21 into cooling duct 27 from outer part 15 of duct 11 that houses turbofan engine 14 to provide added thrust as this air escapes through nozzle 29. The coolant exits the set of tubes in heat exchanger 28 through the coolant exit right upper port of that exchanger to which coolant return line 70 is connected, this port having a coolant temperature sensor represented as a rectangle.

In some circumstances, such as on days when there are high atmospheric temperatures and the fuels in the aircraft are also at relatively high temperatures, the capacity remaining for those fuels to absorb more heat from the coolant and the capacity of air-to-coolant heat exchanger 28 to dissipate more heat to the airstream therethrough from outer portions 15 of duct 11 adjacent engine 14 can together be insufficient to remove enough heat from the coolant. In such a circumstance, protecting the engines and the generator from heat based failures requires that additional heat be removed from the coolant which must ultimately be dissipated in the surrounding atmosphere. A means for doing so in the system of FIG. 1 is based on moving turbofan engine fuel from a tank or tanks in the aircraft fuselage to a tank or tanks in the aircraft wings through a heat exchanger or heat exchangers through which the coolant also passes to thereby have that fuel absorb heat from that coolant. This heated fuel then moves on to the wing tanks where the heat conductively transfers to the wing outer surfaces to dissipate in the atmosphere.

Correspondingly, computer 60 will cause computer controlled valve 84 for the fuselage tank or tanks fuel heat absorption to open to admit coolant under pressure from computer controlled pressurization coolant pump 73 to the chamber of a third coolant-to-fuel heat exchanger, 110, through an interconnection line, 111, connected to the coolant entrance right upper port thereof. There, the admitted coolant flows about and past the set of tubes therein that will carry the fuselage tank fuel sealed therein away from that coolant to raise the temperature of that fuel. This coolant, with its temperature lowered by the transfer of heat to such fuel, will exit the chamber through the coolant exit left lower port of exchanger 110 to reach return line 70 through a further interconnection line, 112.

Fuel from the fuselage tank (not shown) is drawn through an interconnection line, 113, by a tank fuel pump, 114, to the inlet of which this line is connected (at which a fuel temperature sensor is provided represented as a rectangle). Under control of computer 60, the fuel flows through a further line, 115, connected to the pump outlet, to the fuel entrance lower right port of exchanger 110 to enter the set of tubes in the chamber thereof. The fuel, heated by the coolant in the chamber, flows out of those tubes in exchanger 110 through the fuel exit left upper port thereof (at which a fuel temperature sensor is provided represented as a rectangle) into another line, 116, and onward to the wing fuel tank (not shown).

Figure 2A:
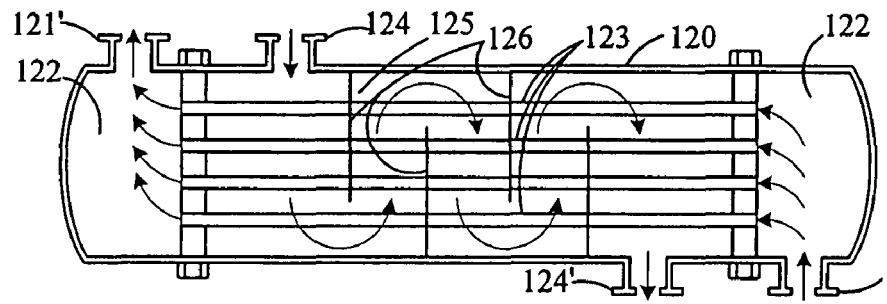
FIG. 2 is a schematic representation of a cross section side view of a device useable in the present invention and a block diagram representation therefor.
Figure 2B:
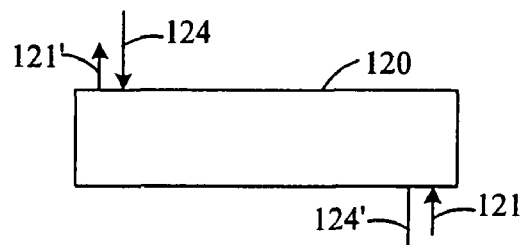

A liquid-to-liquid heat exchanger, 120, representative of coolant-to-fuel heat exchangers 90, 100 and 110 in FIG. 1 is shown in more detail in a representative diagrammatic side view in cross section in FIG. 2A. There, an entrance lower right tube port, 121, opens to a corresponding outer cavity, 122, and an exit upper left tube port, 121', opens to a corresponding outer cavity, 122'. A set of tubes, 123, extends between cavities 122 and 122' to carry a liquid such as fuel from entrance tube port 121 to exit tube port 121' through these outer cavities. A shell entrance upper right port, 124, and a shell exit lower left port, 124', each open to a chamber, 125, therebetween encompassing tubes 123 with the interiors of these tubes being sealed from the chamber to prevent any direct contact between the liquid in the tubes and another liquid in the chamber. Chamber 125 has this other liquid such as a coolant flowing therethrough from entrance shell port 124 to exit shell port 124' so as to flow about and past the outsides of tubes 123 guided by baffles, 126, to thereby permit heat exchanges between the chamber liquid and the tubes liquid across the walls of those tubes. The symbol for such a liquid-to-liquid heat exchanger 120 as used in FIG. 1 (and used also for similar heat exchangers in FIG. 4) is shown as a rectangle in FIG. 2B with the ports there represented by directed lines each having the same designation as was used for the corresponding port in FIG. 2A.

Figure 3A:
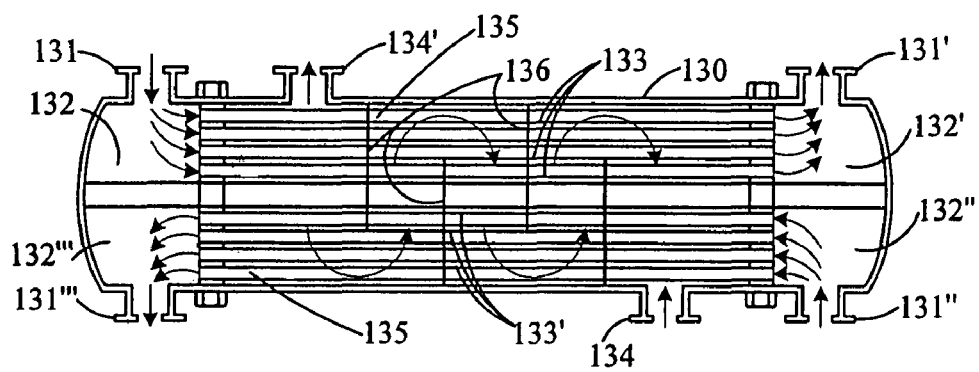
FIG. 3 is a schematic representation of a cross section side view of another device useable in the present invention and a block diagram representation therefor.

Similarly, a dual liquid-to-liquid heat exchanger, 130, representative of dual lubrication liquids-to-coolant heat exchanger 61 in FIG. 1 is shown in more detail in a representative diagrammatic side view in cross section in FIG. 3A. There, a chamber is common to two sets of tubes with one set of tubes forming an upper half of heat exchanger 130 and the other set forming the lower half of that exchanger. In the upper half, an entrance upper left tube port, 131, opens to a corresponding outer cavity, 132, and an exit upper right tube port, 131', opens to a corresponding outer cavity, 132'. A set of tubes, 133, extends between cavities 132 and 132' to carry a liquid such as a lubricant from entrance tube port 131 to exit tube port 131' through these outer cavities. In the same manner in the lower half, an entrance lower right tube port, 131", opens to a corresponding outer cavity, 132", and an exit lower left tube port, 131''', opens to a corresponding outer cavity, 132'''. A set of tubes, 133', extends between cavities 132" and 132''' to carry a liquid such as a lubricant from entrance tube port 131" to exit tube port 131''' through these outer cavities.

Figure 3B:
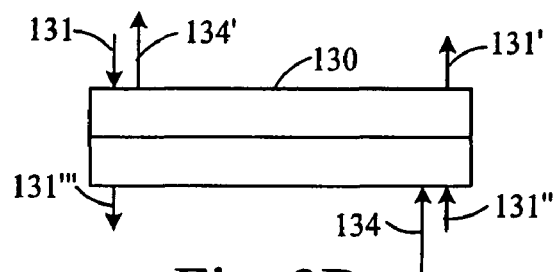

A shell entrance lower interior port, 134, and a shell exit upper interior port, 134', each open to a chamber, 135, therebetween encompassing both tubes set 133 and tubes set 133' with the interiors of these tubes being sealed from the chamber to prevent any direct contact between the liquids in the tubes and another liquid in the chamber. Chamber 135 has this other liquid such as a coolant flowing therethrough from entrance shell port 134 to exit shell port 134' so as to flow about and past the outsides of tubes 133 and 133' guided by baffles, 136, to thereby permit heat exchanges between the chamber liquid and the tubes liquids across the walls of those tubes. The symbol for such a dual liquid-to-liquid heat exchanger 130 as used in FIG. 1 is shown as a rectangle in FIG. 3B with the ports there represented by directed lines each having the same designation as was used for the corresponding port in FIG. 3A.

One instance in which there can be an advantage in using two separate lubricant liquids-to-coolant heat exchangers each separately connected into the cooling system rather than a dual lubrication liquids-to-coolant heat exchanger occurs if the choice for intermittent combustion engine 34 operates at cool enough temperatures and the choice for turbofan engine 14 operates at hot enough temperatures. For such engine choices, as have been made for the system of FIG. 4, a separate lubricant liquid-to-coolant heat exchanger, 61', is provided for cooling the lubricant used in primary electrical power generator 44, and so that generator, and this exchanger operates essentially just as does the lower half of dual lubricant liquids-to-coolant heat exchanger 61 in the system of FIG. 1.

Figure 4:
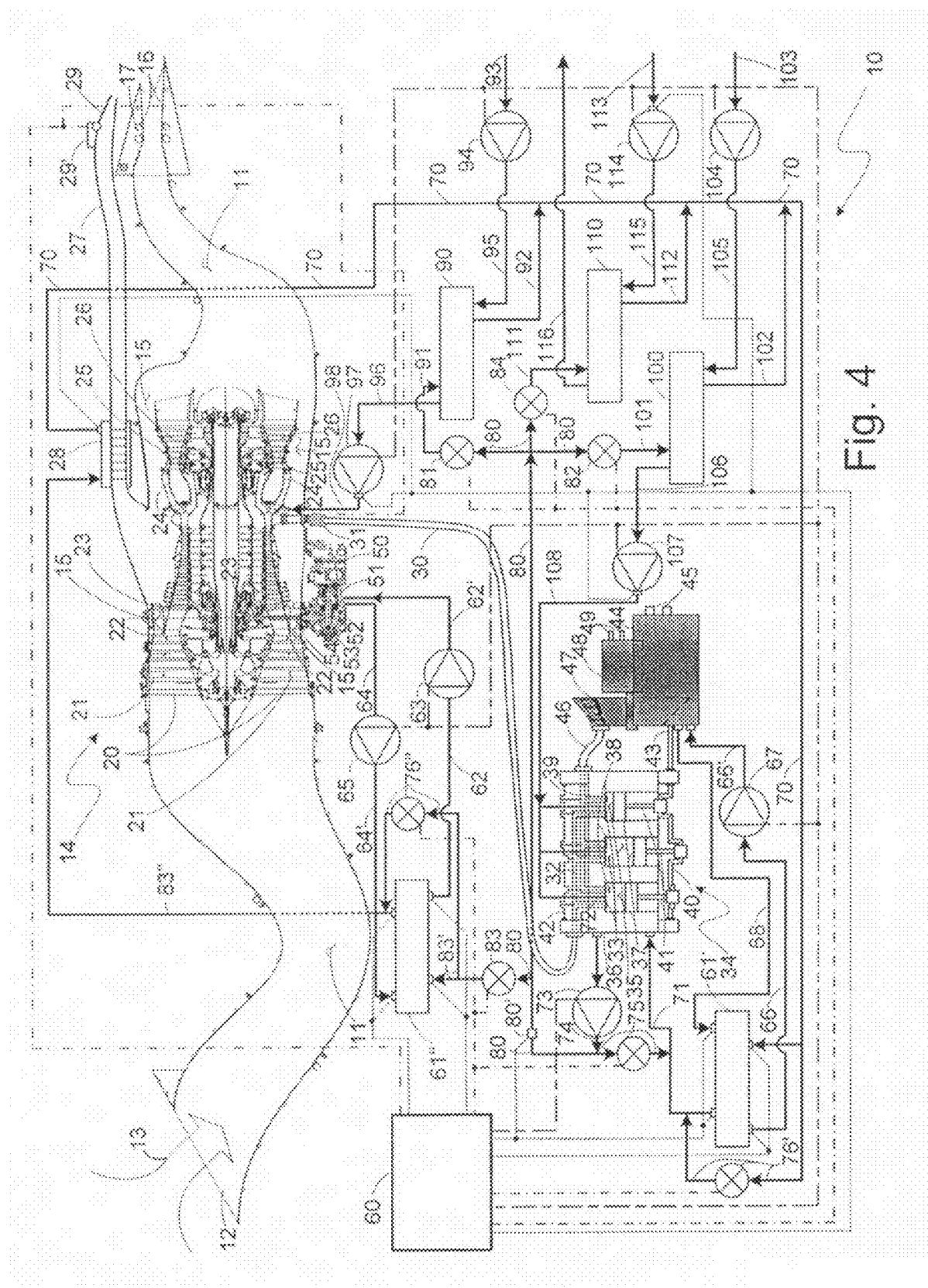
FIG. 4 is a schematic representation of a cross section side view of a portion of another aircraft embodying the present invention.

That is, generator lubricant is forced to circulate between generator 44 and exchanger 61' under the pressure provided by computer controlled generator lubricant pressurization pump 67 as directed by computer 60 (the same designations are used for the system components in FIG. 4 as were used for similar system components in FIG. 1). The lubricant enters this exchanger at the lubricant entrance upper right port thereof to pass through the tube set therein and then leave the exchanger at the lubricant exit lower left port thereof with both ports having lubricant temperature sensors.

Coolant is again drawn from return line 70 by computer controlled pressurization coolant pump 73 under direction of computer 60 through the coolant entrance lower right port of the exchanger to pass through the chamber thereof and then leave same through the coolant exit upper left port (both ports have coolant temperature sensors) to pass through line 71 to and out of the block 36 cooling ducts of intermittent combustion engine 34. Computer 60 can direct coolant to bypass the chamber in exchanger 61' through a bypass arrangement, 76', connected between line 70 at the exchanger coolant entrance lower right port and line 71 at the exchanger coolant exit upper left port. At the outlet of pump 73, the coolant can then be directed by computer 60 again to be sent to reenter engine 34 through bypass arrangement 75, or to enter coolant manifold line 80.

However, a separate lubricant liquid-to-coolant heat exchanger, 61", provided for cooling the lubricant used in turbofan engine 14, does not operate in the system of FIG. 4 just as does the upper half of dual lubricant liquids-to-coolant heat exchanger 61 in the system of FIG. 1. Although the engine lubricant is again forced to circulate between engine 14 and exchanger 61" under the pressure provided by computer controlled turbofan lubricant pressurization pump 63 and computer controlled scavenger pump 65 as directed by computer 60 as before, the coolant flow path therefor now differs. Instead, the coolant entering exchanger 61" does not come directly thereto from the cooling devices through return line 70 to thereby be as cool as possible, but comes thereto from intermittent combustion engine 34 through pump 73, lines 74 and 80, computer controlled valve 83 and line 83', and is thus already somewhat heated. Such an arrangement allows operating turbofan engine at higher temperatures and so more efficiently.

Thus, computer 60 directs engine lubricant to flow from the exit lubricant lower right port in exchanger 61" with a lubricant temperature sensor thereat through pressurization line 62 as pressurized by computer controlled turbofan lubricant pressurization pump 63 under control of computer 60. The lubricant flows through further pressurization line portion 62 to the lubricant entrance port in gearbox 52. That lubricant, after providing lubrication and absorbing heat in this gearbox and engine, then returns to heat exchanger 61" by flowing out of the gearbox lubricant exit port and through scavenger return line 64 as further pressurized by a computer controlled scavenger pump 65 also under control of computer 60. The lubricant flows through further scavenger return line portion 64' to the lubricant entrance upper left port of the exchanger to flow through the tube set therein to the exit lubricant port.

Computer 60 directs the amount of coolant from manifold line 80 that is to pass into the chamber of heat exchanger 61" for cooling this lubricant flow from turbofan engine 14 through causing computer controlled valve 83 for air-to-coolant heat exchanger 28 to suitably open. Opening of valve 83 to a selected degree admits coolant under pressure from computer controlled pressurization coolant pump 73 to flow through interconnection line 83' connected to the coolant entrance left lower port of exchanger 61", which has a coolant temperature sensor thereat, and then through the chamber in that exchanger. The coolant then exits this exchanger at the coolant exit upper right port, which has a coolant temperature sensor thereat, to flow through a conduit interconnection line, 83", to the upper left port of air-to-coolant heat exchanger 28. Computer 60 can reduce the cooling of the lubricant flow from turbofan engine 14 through opening a bypass arrangement, 76" connected to line 83' near the coolant entrance left lower port of exchanger 61" and to line 83" near the exchanger coolant exit upper right port to have some of the coolant bypass exchanger 61".

The coolant flowing from line 83" into the tubes of exchanger 28 heats the air flowing past those tubes that has been forced by high pressure fan 21 into cooling duct 27 from outer part 15 of duct 11 that houses turbofan engine 14 to thereby provide added thrust as this air escapes through nozzle 29. The coolant thereafter exits the set of tubes in heat exchanger 28 to coolant return line 70 as in the system of FIG. 1.

Although the present invention has been described with reference to preferred embodiments, workers skilled in the art will recognize that changes may be made in form and detail without departing from the spirit and scope of the invention.

The invention claimed is:

1. An engine combination for generating forces, the engine system comprising:
   a gas turbine engine having an air inlet open to the atmosphere, an air compressor, a combustor, a turbine and an exhaust exit nozzle open to the atmosphere all positioned along a fluids flow path passing therethrough for generating force, and utilizing an engine lubricant for lubricating moving components in the gas turbine engine, the air compressor having an air transfer duct extending therefrom so as to be capable to provide compressed air in that air transfer duct at one end thereof;
   an internal combustion engine provided as an intermittent combustion engine having an air intake coupled to combustion chambers therein and a rotatable output shaft also coupled to those combustion chambers for generating force, and utilizing a coolant for transporting heat generated in the intermittent combustion engine away therefrom, the air transfer duct being connected to the air intake at an opposite end to be capable of transferring compressed air thereto;
   a coupling heat exchanger coupled to both the gas turbine engine and the intermittent combustion engine as a first coupling subsystem to have the engine lubricant and the coolant pass therethrough to permit the coolant to transport heat in the engine lubricant away therefrom; and
   a cooling heat exchanger coupled to both the coupling heat exchanger and the intermittent combustion engine as a second coupling subsystem to have a remote fluid from a source thereof and the coolant pass therethrough to permit the remote fluid to transport heat in the coolant away therefrom, and with the coolant also circulating through at least one of the coupling heat exchanger and the intermittent combustion engine.

2. The system of claim 1 wherein the source is a storage tank and the remote fluid is fuel being sent from the storage tank to the gas turbine engine for combustion therein.

3. The system of claim 1 wherein the source is a storage tank and the remote fluid is fuel being sent from the storage tank to the intermittent combustion engine for combustion therein.

4. The system of claim 1 further comprising an aircraft having the engine combination positioned therein and wherein the source is a storage tank and the remote fluid is fuel being sent from the storage tank to a wing tank in a wing of the aircraft for storage therein.

5. The system of claim 1 further comprising an aircraft having the engine combination positioned therein and wherein the source is the gas turbine engine and the remote fluid is air forced by the gas turbine engine to the cooling heat exchanger.

6. The system of claim 1 wherein the cooling heat exchanger is a first cooling heat exchanger, the source is a first source, and the remote fluid is a first remote fluid, and further comprising a second cooling heat exchanger selectively coupled to both the coupling heat exchanger and the intermittent combustion engine as a third coupling subsystem to have a second remote fluid from a second source thereof and the coolant at a selectable rate pass therethrough to permit the second remote fluid to transport heat in the coolant away therefrom, and with the coolant also circulating through at least one of the coupling heat exchanger and the intermittent combustion engine.

7. The system of claim 6 further comprising an aircraft having the engine combination positioned therein and wherein the first source is a storage tank and the first remote fluid is fuel being sent from the storage tank to one of the gas turbine engine and the intermittent combustion engine for combustion therein, and wherein the second source is the gas turbine engine and the second remote fluid is air forced by the gas turbine engine to the second cooling heat exchanger.

8. The system of claim 7 further comprising a third cooling heat exchanger selectively coupled to both the coupling heat exchanger and the intermittent combustion engine as a fourth coupling subsystem to have a third remote fluid from a third source thereof and the coolant at a selectable rate pass therethrough to permit the third remote fluid to transport heat in the coolant away therefrom, and with the coolant also circulating through at least one of the coupling heat exchanger and the intermittent combustion engine.

9. The system of claim 8 wherein the third source is a storage tank and the third remote fluid is fuel being sent from the storage tank to a wing tank in a wing of the aircraft for storage therein.

10. The system of claim 1 further comprising a primary electrical generator having a rotatable input shaft mechanically coupled through a coupler to the intermittent combustion engine output shaft and having an output conductor, the output conductor being electrically energized in response to rotation of the input shaft, and utilizing a generator lubricant for lubricating moving components in the primary electrical generator, and wherein the coupling heat exchanger is a dual coupling heat exchanger coupled to the gas turbine engine, the intermittent combustion engine and the primary electrical generator to have the engine lubricant, the generator lubricant and the coolant pass therethrough to permit the coolant to transport heat in the engine lubricant and in the generator lubricant away therefrom.

11. The system of claim 10 wherein the cooling heat exchanger is a first cooling heat exchanger, the source is a first source, and the remote fluid is a first remote fluid, and further comprising a second cooling heat exchanger selectively coupled to both the dual coupling heat exchanger and the intermittent combustion engine as a third coupling subsystem to have a second remote fluid from a second source thereof and the coolant at a selectable rate pass therethrough to permit the second remote fluid to transport heat in the coolant away therefrom, and with the coolant also circulating through at least one of the dual coupling heat exchanger and the intermittent combustion engine.

12. The system of claim 11 further comprising an aircraft having the engine combination positioned therein and wherein the first source is a storage tank and the first remote fluid is fuel being sent from the storage tank to one of the gas turbine engine and the intermittent combustion engine for combustion therein, and wherein the second source is the gas turbine engine and the second remote fluid is air forced by the gas turbine engine to the second cooling heat exchanger.

13. The system of claim 12 further comprising a third cooling heat exchanger selectively coupled to both the dual coupling heat exchanger and the intermittent combustion engine as a fourth coupling subsystem to have a third remote fluid from a third source thereof and the coolant at a selectable rate pass therethrough to permit the third remote fluid to transport heat in the coolant away therefrom, and with the coolant also circulating through at least one of the dual coupling heat exchanger and the intermittent combustion engine.

14. The system of claim 13 wherein the third source is a storage tank and the third remote fluid is fuel being sent from the storage tank to a wing tank in a wing of the aircraft for storage therein.

15. The system of claim 1 wherein the coupling heat exchanger is a first coupling heat exchanger and further comprising a primary electrical generator having a rotatable input shaft mechanically coupled through a coupler to the intermittent combustion engine output shaft and having an output conductor, the output conductor being electrically energized in response to rotation of the input shaft, and utilizing a generator lubricant for lubricating moving components in the primary electrical generator, and a second coupling heat exchanger coupled to the first coupling heat exchanger, the intermittent combustion engine and the cooling heat exchanger as a third coupling subsystem to have a the generator lubricant and the coolant pass therethrough to permit the coolant to transport heat in the generator lubricant away therefrom, and with the coolant also circulating through the first coupling heat exchanger, the intermittent combustion engine and the cooling heat exchanger.

16. The system of claim 15 wherein the cooling heat exchanger is a first cooling heat exchanger, the source is a first source, and the remote fluid is a first remote fluid, and further comprising a second cooling heat exchanger selectively coupled to at least one of the first and second coupling heat exchangers and to the intermittent combustion engine as a third coupling subsystem to have a second remote fluid from a second source thereof and the coolant at a selectable rate pass therethrough to permit the second remote fluid to transport heat in the coolant away therefrom, and with the coolant also circulating through at least one of the first and second coupling heat exchangers and the intermittent combustion engine.

17. The system of claim 16 further comprising an aircraft having the engine combination positioned therein and wherein the first source is a storage tank and the first remote fluid is fuel being sent from the storage tank to one of the gas turbine engine and the intermittent combustion engine for combustion therein, and wherein the second source is the gas turbine engine and the second remote fluid is air forced by the gas turbine engine to the second cooling heat exchanger.

18. The system of claim 17 further comprising a third cooling heat exchanger selectively coupled to at least one of the first and second coupling heat exchangers and to the intermittent combustion engine as a fourth coupling subsystem to have a third remote fluid from a third source thereof and the coolant at a selectable rate pass therethrough to permit the third remote fluid to transport heat in the coolant away therefrom, and with the coolant also circulating through at least one of the first and second coupling heat exchangers and the intermittent combustion engine.

19. The system of claim 18 wherein the third source is a storage tank and the third remote fluid is fuel being sent from the storage tank to a wing tank in a wing of the aircraft for storage therein.

20. A power generation system for propelling, and generating electrical power in, an aircraft, the system comprising:
 a turbofan engine in an engine compartment in the aircraft with an air inlet in the aircraft open to the atmosphere and leading to an air compressor in the turbofan engine followed by a combustor, and utilizing an engine lubricant for lubricating moving components in the turbofan engine, the air compressor having an air transfer duct extending therefrom so as to be capable of providing compressed air therein and to the combustor;
 an internal combustion engine provided as an intermittent combustion engine in the aircraft having an air intake coupled to combustion chambers therein, a rotatable output shaft also coupled to those combustion chambers for generating force, and a fuel system for providing fuel to those combustion chambers, and utilizing a coolant for transporting heat generated in the intermittent combustion engine away therefrom, the air transfer duct being connected to the air intake to transfer compressed air thereto;
 a coupling heat exchanger coupled to both the turbofan engine and the intermittent combustion engine as a first coupling subsystem to have the engine lubricant and the coolant pass therethrough to permit the coolant to transport heat in the engine lubricant away therefrom; and
 a cooling heat exchanger coupled to both the coupling heat exchanger and the intermittent combustion engine as a second coupling subsystem to have a remote fluid from a source thereof and the coolant pass therethrough to permit the remote fluid to transport heat in the coolant away therefrom, and with the coolant also circulating through at least one of the coupling heat exchanger and the intermittent combustion engine.

* * * * *